United States Patent [19]

Fort et al.

[11] 4,115,073
[45] Sep. 19, 1978

[54] PROCESS GAS SOLIDIFICATION SYSTEM

[75] Inventors: William G. S. Fort; William W. Lee, Jr., both of Oak Ridge, Tenn.

[73] Assignee: The United States of America as represented by the United States Department of Energy, Washington, D.C.

[21] Appl. No.: 808,860

[22] Filed: Jun. 21, 1977

[51] Int. Cl.$^2$ ............... G21F 9/02; C01G 43/06
[52] U.S. Cl. ................... 23/293 R; 62/66; 252/301.1 W
[58] Field of Search ............... 62/66; 264/0.5; 23/305 R, 293; 252/301.1 W

[56] References Cited

U.S. PATENT DOCUMENTS 2,649,702  8/1953  Kellie ................... 62/66

OTHER PUBLICATIONS

Ishii, B. et al., *Chemical Abstracts*, 85, (1976), 69867k.
Takeda, S., *Chemical Abstracts*, 85, (1976), 100994a.

*Primary Examiner*—Benjamin R. Padgett
*Assistant Examiner*—Deborah L. Kyle
*Attorney, Agent, or Firm*—Dean E. Carlson; Stephen D. Hamel; Fred O. Lewis

[57] ABSTRACT

It has been the practice to (a) withdraw hot, liquid $UF_6$ from various systems, (b) direct the $UF_6$ into storage cylinders, and (c) transport the filled cylinders to another area where the $UF_6$ is permitted to solidify by natural cooling. However, some hazard attends the movement of cylinders containing liquid $UF_6$, which is dense, toxic, and corrosive.

As illustrated in terms of one of its applications, the invention is directed to withdrawing hot liquid $UF_6$ from a system including (a) a compressor for increasing the pressure and temperature of a stream of gaseous $UF_6$ to above its triple point and (b) a condenser for liquefying the compressed gas. A network containing block valves and at least first and second portable storage cylinders is connected between the outlet of the condenser and the suction inlet of the compressor. After an increment of liquid $UF_6$ from the condenser has been admitted to the first cylinder, the cylinder is connected to the suction of the compressor to flash off $UF_6$ from the cylinder, thus gradually solidifying $UF_6$ therein. While the first cylinder is being cooled in this manner, an increment of liquid $UF_6$ from the condenser is transferred into the second cylinder. $UF_6$ then is flashed from the second cylinder while another increment of liquid $UF_6$ is being fed to the first. The operations are repeated until both cylinders are filled with solid $UF_6$, after which they can be moved safely. As compared with the previous technique, this procedure is safer, faster, and more economical. The method also provides the additional advantage of removing volatile impurities from the $UF_6$ while it is being cooled.

10 Claims, 3 Drawing Figures

PROCESS GAS SOLIDIFICATION SYSTEM

BACKGROUND OF THE INVENTION

This invention was made during the course of, or under, a contract with the United States Energy Research and Development Administration.

The invention relates generally to methods for handling fluid uranium hexafluoride. More particularly, it relates to methods for withdrawing liquid uranium hexafluoride from a system and storing it as a solid in a plurality of containers.

In the United States gaseous diffusion plants for the separation of uranium isotopes, uranium hexafluoride ($UF_6$) is employed as the process gas. Certain diffusion plant operations entail the withdrawal and storage of process gas. One routinely employed technique for accomplishing the withdrawal and storage comprises directing a stream of the gaseous $UF_6$ into a compressor, which increases the pressure and temperature of the $UF_6$ to above its triple point. The pressurized gas then is cooled just enough to liquefy it, after which the resulting hot, liquid $UF_6$ is directed into a plurality of storage cylinders. After the typical cylinder is filled with liquid $UF_6$, it is replaced with an empty cylinder. The liquid-filled cylinder is removed to a cylinder-storage area, where the $UF_6$ in the cylinder is permitted to solidify by natural cooling. Because the storage cylinders have $UF_6$ capacities of as much as fourteen tons, solidification of the $UF_6$ by natural cooling may take as long as four or five days.

Although the procedure just described has been used at the gaseous diffusion plants for many years, it is subject to the disadvantage that it entails the movement of large cylinders, each containing thousands of pounds of a dense, corrosive, and toxic liquid. A possible alternative to the usual procedure would comprise circulating a coolant or refrigerant about the exterior of the typical storage cylinder while it is positioned at the withdrawal point, thus effecting in-situ solidification of the $UF_6$. Unfortunately, that technique requires an impractically long time to solidify all of the $UF_6$ in the cylinder. That is, external cooling readily solidifies $UF_6$ adjacent to the cylinder wall but requires a much longer time to solidify $UF_6$ in the region of the axis.

Certain gaseous diffusion cascade operations have entailed introducing gaseous $UF_6$ to a refrigerated vessel to solidify the same; storing the solidified $UF_6$ in the vessel; and subsequently evacuating the vessel by warming it and flash-evaporating the $UF_6$ into an evacuated line.

Accordingly, it is an object of this invention to provide an improved method for charging one or more storage vessels with liquid $UF_6$ and solidifying the $UF_6$ therein.

It is another object to provide a relatively rapid and efficient method for effecting solidification of $UF_6$ in closed storage vessels containing liquid $UF_6$ at an elevated temperature and pressure.

It is another object to accomplish such solidification by a method which removes volatile impurities from the $UF_6$ being solidified.

Other objects will be made evident hereinafter.

CROSS-REFERENCED PUBLICATIONS

The following article describes gaseous diffusion processes and stages (e.g., Badger stages for separating a feed stream of gaseous uranium hexafluoride into substreams of differing isotopic content): *Encyclopedia of Chemical Technology*, Vol. 7, (1965), pp. 92–119. Copending, coassigned U.S. patent application Ser. No. 696,149, filed on June 14, 1976, discloses a vessel for desubliming gaseous $UF_6$ and then melting the resulting solid. The properties of $UF_6$ are described in many references. such as the following: J. J. Katz and E. Rabinowitch, ed., *Chemistry of Uranium* (Office of Technical Services, Department of Commerce, Washington, D.C., 1958).

SUMMARY OF THE INVENTION

One form of the invention may be summarized as follows: In a process wherein gaseous $UF_6$ is withdrawn from a first system and directed into a second system for converting the gas to liquid $UF_6$ at an elevated temperature, the improved method for withdrawing the resulting liquid $UF_6$ from the second system and storing it as a solid in a plurality of storage vessels, said method comprising the steps of: (a) directing an increment of liquid $UF_6$ from the second system into a first closed storage vessel; (b) flash-evaporating $UF_6$ from the first vessel into one of the first system and second system to cool and solidify $UF_6$ in the first vessel while directing an increment of liquid $UF_6$ from the second system into a second closed storage vessel; (c) flash-evaporating $UF_6$ from the second vessel into one of the first system and second system to cool and solidify $UF_6$ in the second vessel while directing another increment of liquid $UF_6$ from the second system into the first vessel; and (d) flash-evaporating $UF_6$ from the first vessel into one of the first system and second system to cool and solidify additional $UF_6$ in the first vessel.

Another form of the invention is summarized as follows: In a process wherein gaseous $UF_6$ is directed into a system including a compressor for increasing the temperature and pressure of the gaseous $UF_6$ to above its critical point and also including a cooler for liquefying the gas so compressed, the improved method for withdrawing $UF_6$ from said system and storing it in a portable storage vessel as a solid, said method comprising: feeding liquid $UF_6$ from said system into said vessel while flash-evaporating to the suction side of said compressor part of the liquid $UF_6$ so fed to said vessel, thus effecting cooling and solidification of $UF_6$ in said vessel.

DESCRIPTION OF THE PREFERRED EMBODIMENT

Figure 1:
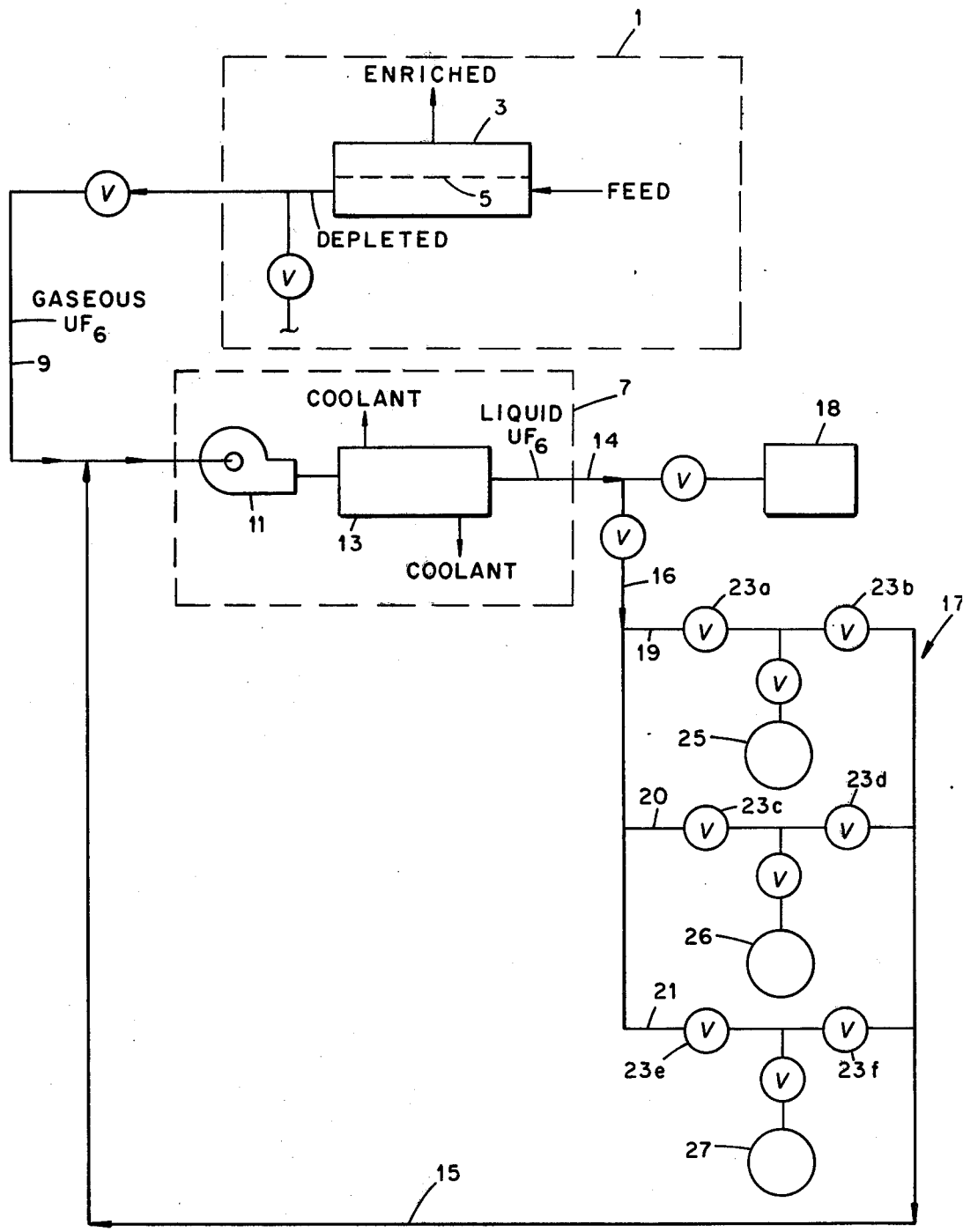
FIG. 1 is a schematic diagram of apparatus for carrying out the method of this invention.

The principle of the invention will first be discussed in terms of FIG. 1, where the numeral 1 designates a conventional gaseous diffusion stage of the so-called Badger type. As shown, the stage includes a diffusion converter 3 containing porous gaseous diffusion barrier 5 for separating a feed stream of hot, gaseous $UF_6$ into an enriched (diffused) stream and a depleted (undiffused) stream. A conventional system 7 is connected to receive a stream of depleted, hot gaseous $UF_6$ from the stage 1 via a line 9 and to liquefy the same. In this illustration, the system 7 includes (a) standard compressor means 11 for pressurizing the depleted $UF_6$ to increase its pressure and temperature above its triple point and (b) a condenser 13 for cooling the compressed gas just enough to liquefy it. The suction side of compressor 11 is connected to line 9, as shown. Hot liquid $UF_6$ is discharged from the condenser 13 through an outlet line 14, which can be connected to the inlet 16 of a network 17 or to an accumulator 18.

In accordance with this invention, a network 17 of block valves 23a–23f and storage cylinders 25–27 is connected between aforementioned inlet line 16 and an outlet line 15, the latter being connected to suction line 9 of the liquefaction system 7. As shown, the network 17 comprises three parallel-connected lines 19–21. Typical line 19 includes block valves 23a and 23b and a valved storage cylinder 25. The inlet of the cylinder valve is connected to line 19 at a point between its block valves. The various block valves and cylinders may be of conventional design.

A typical operation of the network 17 is as follows, it being assumed that initially all of the block valves 23a–23f are in the closed position. Block valve 23a is opened to partially fill cylinder 25 with a first increment of hot liquid $UF_6$ from the condenser 13. Upon completion of this transfer, valve 23a is closed. Valve 23b then is opened to connect the region above the liquid in cylinder 25 to the suction line 9 of the compressor 11. As a result, $UF_6$ flashes (is flash-evaporated) into line 9, cooling and solidifying the $UF_6$ in the cylinder. Valve 23c also is opened so that while cylinder 25 is being cooled, cylinder 26 is being charged with an increment of hot liquid $UF_6$ from line 16. On completion of the liquid transfer to cylinder 26, valves 23b and 23c are closed and valves 23a and 23d are opened to effect concurrent transfer of a second increment of liquid $UF_6$ to cylinder 25 and solidification of $UF_6$ in cylinder 26. These operations are repeated until cylinders 25 and 26 contain the desired amount of solid $UF_6$, at which time the operator closes valves 23a and 23d. Valve 23e then is opened to charge cylinder 27 with a preselected increment of the hot liquid $UF_6$. While cylinder 27 is being charged, cylinders 25 and 26 can be safely moved, permitting empty cylinders to be positioned in their place. The filled cylinders may be transported immediately to other areas for storage or use.

The operation conditions for an arrangement of the kind shown in FIG. 1 are not highly critical. The following is a summary of one set of suitable operating conditions for accomplishing the objectives of the invention with two nickel-clad steel cylinders having a wall thickness of approximately 5/16 inch.

Capacity of each cylinder: 28000 lb.
Temperature of liquid $UF_6$ outflow from condenser 13: 148° F. to 180° F.
Suction pressure of compressor 11: 5 psia
Typical discharge pressure of compressor 11: 30 psia
Typical withdrawal rate of $UF_6$ from plant: 2200 lb/hr.
Typical liquid $UF_6$-transfer rate to a cylinder: 3100 lb/hr.
Typical rate at which vapor is pumped from cylinder: 900 lb/hr.
Time required to fill both of the cylinders with solid $UF_6$: 26 hrs.

This invention provides several significant advantages. First, $UF_6$ transfer and solidification are accomplished at the withdrawal point, avoiding the need to move cylinders containing liquid $UF_6$. Second, the transfer and solidification are accomplished more rapidly and with less complex apparatus than if external cooling were employed. Third, cooling is effected by a technique which effects removal of various volatile impurities from the liquid $UF_6$ in the cylinders impurities such as hydrogen fluoride and Freon. Fourth, by reducing the time required for solidification of the $UF_6$ the invention permits a reduction in carrying charges.

In the present gaseous diffusion plants, the typical existing $UF_6$-liquefaction system (7, FIG. 1) is sized large enough to handle the additional load imposed by operating in accordance with the invention. Thus, no redesign of the system is required. Preferably, the liquid $UF_6$ fed to the system 7 is at a relatively low temperature consistent with avoiding solidification—e.g., a temperature of from approximately 200° F.—but it may be as high as 150° F. to its critical temperature.

For convenience, the invention has been illustrated in terms of a network 17 comprising manually operated valves and only three storage cylinders. It will be apparent, however, that any suitable automatic valves and control instrumentation may be employed. It also will be apparent that the invention is applicable to the filling and cooling of additional cylinders in the manner described. The invention may, of course, be utilized with $UF_6$ of any assay (so long as equipment of "always-safe" geometry is employed), and the $UF_6$ may be derived from any suitable source (e.g., other kinds of gaseous diffusion stages or a gas centrifuge system for separating a stream of $UF_6$ into substreams of different isotopic concentration).

Figure 2:
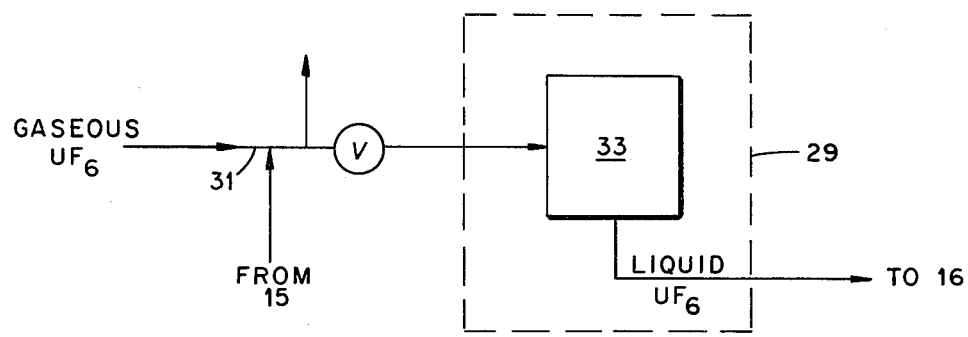
FIG. 2 is a schematic diagram of alternative means for effecting the purposes of a system designated as 7 in FIG. 1.

Again, the invention may be used in conjunction with any suitable $UF_6$-liquefaction system—for instance, the conventional system designated as 29 in FIG. 2. In that particular arrangement, gaseous $UF_6$ at subatmospheric pressure is directed from a header 31 into cold trap 33. The trap is a conventional type provided with both cooling and heating means. (Such a trap is disclosed in above-referenced Ser. No. 686,149). The trap first is cooled to convert a selected amount of gaseous $UF_6$ directly to a solid. Then the trap is valved off from the header 31 and is heated to convert the solid to hot, liquid $UF_6$, which is fed to the inlet of a network similar to 17 (FIG. 1) for introduction to storage cylinders in accordance with the invention. Solidification of the liquid in the cylinders is effected as described by flash-evaporating $UF_6$ from the cylinders into the header 31, as by the outlet line 15 for the network.

Figure 3:
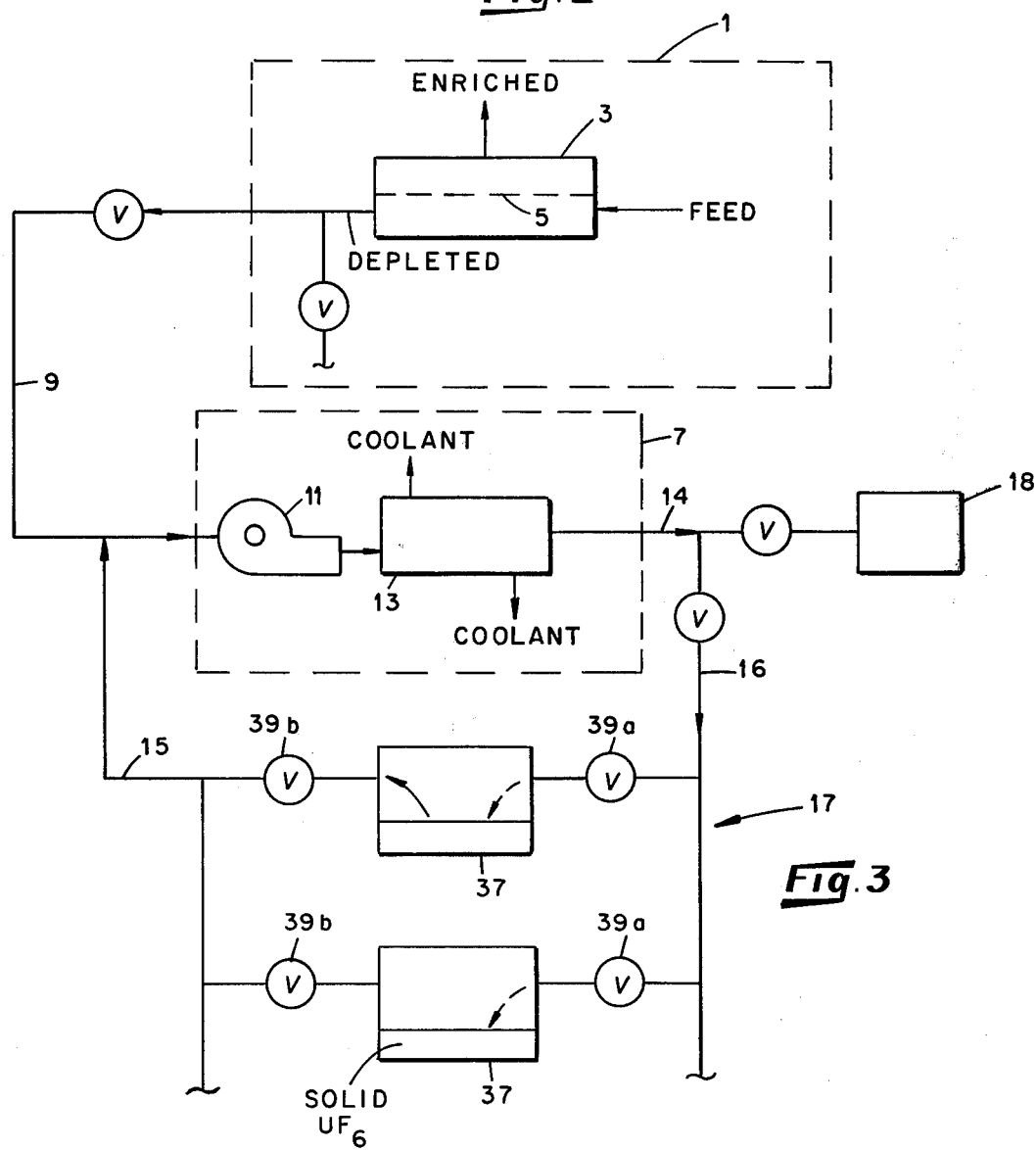
FIG. 3 is a schematic diagram of FIG. 1 as modified to carry out an alternative form of the invention.

In another form of the invention, shown in FIG. 3, the network 17 comprises parallel-connected storage vessels 37, connected across the $UF_6$-liquefaction system 7. Each of the storage vessels 37 includes a valve 39a for the introduction of liquid $UF_6$ from line 16 and another valve 39b for the removal of $UF_6$ vapor derived from the introduced liquid. In a typical operation, liquid $UF_6$ (dashed arrows) is fed to the vessels through the valves 39a; concurrently, $UF_6$ in the form of vapor (solid arrows) is flash-evaporated from the vessels to the inlet of the liquefaction system, through the valves 39b. That is, solidification of $UF_6$ in each vessel is effected by simultaneously introducing liquid $UF_6$ and flashing off $UF_6$ vapor. Thus, the heat of fusion evolved by solidification supplies the heat of vaporization for flashing off the $UF_6$. This mode of operation is rapid, safe, and economical. The $UF_6$-containment means may comprise one or more standard storage cylinders. A temperature in the range of about 150°–200° F. is preferred for the liquid $UF_6$ fed to the cylinders.

When the solid UF$_6$ in the cylinders has accumulated to the desired level, they are disconnected from the UF$_6$ system for transport to a suitable storage area. Empty cylinders then are connected in their place.

It will be apparent to those versed in the art that various modifications and changes may be made in the method and apparatus described herein. It is the intention that this invention be construed in the broadest manner consistent with the accompanying claims.

What is claimed is:

1. In a process wherein gaseous UF$_6$ is withdrawn from a first system and directed into a second system for converting the gas to liquid UF$_6$ at an elevated temperature, the improved method for withdrawing the resulting liquid UF$_6$ from the second system and storing it as a solid in a plurality of storage vessels, said method comprising the steps of:
    (a) directing an increment of liquid UF$_6$ from the second system into a first closed storage vessel;
    (b) flash-evaporating UF$_6$ from the first vessel into one of the first system and second system to cool and solidify UF$_6$ in the first vessel while directing an increment of liquid UF$_6$ from the second system into a second closed storage vessel;
    (c) flash-evaporating UF$_6$ from the second vessel into one of the first system and second system to cool and solidify UF$_6$ in the second vessel while directing another increment of liquid UF$_6$ from the second system into the first vessel; and
    (d) flash-evaporating UF$_6$ from the first vessel into one of the first system and second system to cool and solidify additional UF$_6$ in the first vessel.

2. The method of claim 1 wherein said elevated temperature is in the range of from approximately 148° F. to 480° F.

3. The method of claim 1 wherein the storage vessel to be filled are initially at substantially ambient temperature.

4. The method of claim 1 wherein the second system comprises:
    (a) a compressor for increasing the pressure of said gaseous UF$_6$ to above its triple point, and
    (b) a condenser for converting the compressed UF$_6$ to liquid UF$_6$.

5. The method of claim 1 wherein the second system comprises:
    (a) cooling means for directly converting said gaseous UF$_6$ to a solid, and
    (b) heating means for converting the resulting solid UF$_6$ to liquid UF$_6$.

6. In a process wherein gaseous UF$_6$ is withdrawn from a first system and directed into a second system for converting the gas to liquid UF$_6$ having a vapor pressure exceeding the pressure of the gaseous UF$_6$ in the first system, the improved method for withdrawing the liquid UF$_6$ from said second system and storing it as a solid in a plurality of storage vessels comprising the steps of:
    (a) directing an increment of liquid UF$_6$ from the second system into a first closed storage vessel;
    (b) flash-evaporating UF$_6$ from the first vessel into the first system while directing an increment of liquid UF$_6$ from the second system into a second closed storage vessel;
    (c) flash-evaporating UF$_6$ from the second vessel into the first system to cool and solidify UF$_6$ in the second vessel while directing another increment of liquid UF$_6$ from the second system into the first vessel; and
    (d) flash-evaporating UF$_6$ from the first vessel into the first system to cool and solidify UF$_6$ in the first vessel.

7. The method of claim 6 wherein the liquid UF$_6$ directed into the storage vessels is at a temperature in the range of from approximately 150° F. to 200° F.

8. In a process wherein gaseous UF$_6$ is directed into a system which includes a compressor for increasing the temperature and pressure of the gaseous UF$_6$ to above its critical point and a cooler for liquefying the gas so compressed, the improved method for withdrawing liquid UF$_6$ from said system and storing it in portable storage vessels as a solid, said method comprising:
    feeding liquid UF$_6$ from said system into each of said vessels while flash-evaporating to the suction side of said compressor part of the liquid UF$_6$ so fed to each of said vessels, thus effecting cooling and solidification of UF$_6$ in said vessels.

9. The method of claim 7 wherein said vessels are at room temperature when said liquid UF$_6$ is first introduced thereto.

10. The method of claim 8 wherein after said vessels are filled to a desired level with solid UF$_6$, they are replaced by empty vessels in which solid UF$_6$ is deposited by the method set forth.

* * * * *